(12) United States Patent
Kragh et al.

(10) Patent No.: US 9,103,934 B2
(45) Date of Patent: Aug. 11, 2015

(54) METHOD FOR REDUCING MARINE SOURCE VOLUME WHILE MAINTAINING IMAGE QUALITY

(75) Inventors: Julian Edward Kragh, Finchingfield (GB); Robert Laws, Cambridge (GB); Jon-Fredrik Hopperstad, Cambridge (GB)

(73) Assignee: WESTERNGECO L.L.C., Houston, TX (US)

( * ) Notice: Subject to any disclaimer, the term of this patent is extended or adjusted under 35 U.S.C. 154(b) by 1085 days.

(21) Appl. No.: 12/690,430

(22) Filed: Jan. 20, 2010

(65) Prior Publication Data

US 2011/0032795 A1   Feb. 10, 2011

Related U.S. Application Data

(60) Provisional application No. 61/231,526, filed on Aug. 5, 2009.

(51) Int. Cl.
*G01V 1/38* (2006.01)
*G01V 1/32* (2006.01)

(52) U.S. Cl.
CPC ............... *G01V 1/32* (2013.01); *G01V 1/3808* (2013.01)

(58) Field of Classification Search
CPC ............................... G01V 1/32; G01V 1/3808
USPC ................. 114/244, 253; 181/110, 115, 118; 367/16, 20, 21, 23, 24, 144; 382/1, 16, 382/21, 109, 286; 702/14, 16, 17
See application file for complete search history.

(56) References Cited

U.S. PATENT DOCUMENTS

| | | | | |
|---|---|---|---|---|
| 4,956,822 | A  * | 9/1990 | Barber et al. | 367/23 |
| 5,148,494 | A  * | 9/1992 | Keskes | 382/109 |
| 5,532,975 | A  * | 7/1996 | Elholm | 367/16 |
| 6,493,636 | B1 * | 12/2002 | DeKok | 702/17 |
| 6,775,618 | B1 * | 8/2004 | Robertsson et al. | 702/14 |
| 7,480,204 | B2 | 1/2009 | Robertsson et al. | |
| 2005/0265122 | A1* | 12/2005 | Grion | 367/21 |
| 2008/0228402 | A1 | 9/2008 | Ferber | |
| 2009/0040872 | A1 | 2/2009 | Pabon et al. | |

(Continued)

FOREIGN PATENT DOCUMENTS

| | | | | |
|---|---|---|---|---|
| GB | 2446825 | | 8/2009 | |
| WO | WO 0116621 | A1 * | 3/2001 | G01V 1/02 |

OTHER PUBLICATIONS

"Background Paper to EPBC Act Policy Statement 2.1—Interaction between offshore seismic exploration and whales," Australian Government, Department of the Environment, Water, Heritage and the Arts, Sep. 2008, pp. 1-7.*

(Continued)

*Primary Examiner* — Daniel L Murphy

(57) ABSTRACT

A technique facilitates the acquisition of seismic data at a substantially reduced source volume. The methodology generally comprises conducting a seismic survey with seismic sources that have a reduced source volume to collect seismic data. The low frequency data which is lost due to the reduced source volume is replaced with data acquired from a complementary method, such as a receiver-side acquisition method. The two sets of data are combined to provide a comprehensive seismic survey image without requiring conventional seismic source volume.

19 Claims, 4 Drawing Sheets

(56) References Cited

U.S. PATENT DOCUMENTS

2009/0161487 A1 6/2009 Kjellgren et al.
2012/0075950 A1 3/2012 Kragh et al.

OTHER PUBLICATIONS

PCT Search Report, dated Feb. 24, 2011, Application No. PCT/US2010/044602.

David Hill, er al, .Over/under acquisition and data processing: the next quantum leap in seismic technology?, First Break, Jun. 2006, pp. 81-95, vol. 24, EAGE.

Ed Kragh, et al., A Method for Efficient Broadband Marine Acquisition and Processing, 71st EAGE Conference & Exhibition, Jun. 8-11, 2009, Amsterdam, The Netherlands.

Laws, et al., Shot-generated noise, 70th EAGE Conference & Exhibition, Jun. 19-12, 2008, Rome, Italy.

Andrew Long, et al., A calibrated dual-sensor streamer investigation of deep target signal resolution and penetration on the NW Shelf of Australia, SEG Las Vegas 2008 Annual Meeting.

Bradnon Southall, et al., Marine Mammal Noise Exposure Criteria: Initial Scientific Recommendations, Aquatic Mammals, 2007, pp. 411-521, vol. 33, No. 4.

Kinkead, et al., "Processing Dual Sensor Streamer Data from an Ultra Deep Water Area Offshore Guyana," SEG Houston International Exposition an dAnnual Meeting, 2009, pp. 1-5.

Tabti, et al., "Conventional versus dual-sensor streamer data de-ghosting: a case sturdy from the Haltenbanken dual-streamer acquisition," SEG Houston International Exposition and Annual Meeting, 2009, pp. 1-5.

Tenghamn et al., "GeoStreamer — increasing the signal-to-noise ratio using a dual-sensor towed streamer," first break, Oct. 2009, vol. 27, pp. 45-51.

\* cited by examiner

METHOD FOR REDUCING MARINE SOURCE VOLUME WHILE MAINTAINING IMAGE QUALITY

CROSS-REFERENCE TO RELATED APPLICATION

The present document is based on and claims priority to U.S. Provisional Application Ser. No. 61/231,526, filed Aug. 5, 2009.

BACKGROUND

There is a progressively increasing awareness of the acoustic pollution caused by marine seismic surveys. The risk of causing hearing damage in marine mammals is currently mitigated by the 'exclusion zone' around the seismic source and by the prohibition of seismic surveying in some areas at certain times of the year. Such limitations are likely to become more onerous as exploration moves to more extreme latitudes. Recently an agreed set of criteria has been published for estimating hearing damage in marine mammals.

SUMMARY

In general, the present invention provides a methodology for acquiring seismic data at reduced source volume. The methodology generally comprises conducting a seismic survey with seismic sources that have a reduced source volume. The low frequency data which is lost due to the reduced source volume is replaced with data acquired from a complementary method, such as a receiver-side acquisition method. The data are combined to provide a comprehensive seismic survey image without ever requiring any enhanced, i.e. conventional, seismic source volume.

BRIEF DESCRIPTION OF THE DRAWINGS

Certain embodiments of the invention will hereafter be described with reference to the accompanying drawings, wherein like reference numerals denote like elements, and.

DETAILED DESCRIPTION

In the following description, numerous details are set forth to provide an understanding of the present invention. However, it will be understood by those of ordinary skill in the art that the present invention may be practiced without these details and that numerous variations or modifications from the described embodiments may be possible.

In general, the present methodology relates to marine seismic data acquisition, and more particularly to source technology used in generating seismic data. The present methodology further relates to a technique for reducing the volume of a marine seismic source to reduce the effect and interaction with marine mammal life. The damage zone around the seismic source can be significantly reduced. Small, reduced volume sources are particularly favorable in environmentally sensitive areas.

However, reducing the volume of the source array also reduces the signal-to-noise ratio in the acquired seismic data and, when using traditional acquisition methods, can reduce the quality of the seismic image. This is particularly true for the image at depth (large times) where it is the low frequencies that dominate the image.

To be able to use a small seismic source while maintaining acceptable quality seismic data, the reduced source energy needs to be compensated for. This can be achieved by acquiring the reduced source data combined with novel receiver-side acquisition methods which are designed to increase the signal-to-noise ratio, particularly in the lower frequencies (e.g., below around 20 Hz) where the lack of source energy is most significant. Examples of novel receiver-side acquisition methods are over/under streamers, sparse under marine acquisition and multi-component streamers.

The improvement in signal-to-noise achieved by these receiver systems can be 12 dB or more in the low frequencies. The 12 dB improvement translates to a reduction in the source energy output of a factor of 4. For higher frequencies in the seismic image, there is already more than sufficient energy and thus reducing the source strength in the upper frequencies does not affect the image quality.

Figure 1:
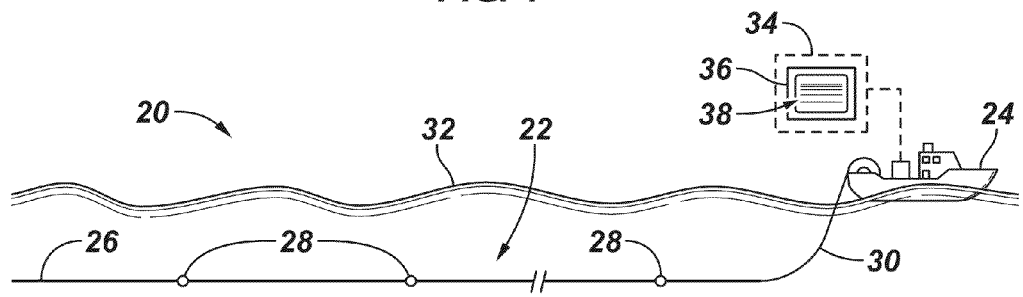
FIG. 1 is a schematic view of a seismic vessel pulling a seismic source array with seismic sources operated at a reduced seismic source volume, according to an embodiment of the present invention.

Referring generally to FIG. 1, an example of a seismic survey system 20 is illustrated according to one embodiment of the present invention. As illustrated, system 20 comprises a source array 22 towed by a tow vessel 24. The source array 22 may be constructed with one or more streamers 26 having a plurality of seismic sources 28, e.g. air guns, to provide the desired acoustic signal used in conducting marine seismic surveys. The one or more streamers 26 are coupled to tow vessel 24 via a bridle 30, and the streamers are towed at a desired depth beneath the surface 32 of the sea.

Signals from the seismic sources 28 are reflected back from features of the subject reservoir and those reflected signals are detected by corresponding receivers which also may be deployed in streamers 26, as known to those of ordinary skill in the art. The data collected based on the seismic source signals is transmitted to the tow vessel 24 and analyzed on a computer-based system 34. The computer system 34 may be located on the tow vessel 24 or at any other suitable processing location. In many applications, the computer system 34 is used to process the data and output information related to the marine survey region to a display 36 coupled to the computer system 34. Display 36 may comprise a graphical user interface and is able to display a comprehensive, seismic survey image 38.

In the embodiment illustrated, the source volume of seismic sources 28 is substantially reduced by reducing the energy and/or number of seismic sources 28. However, the system is still able to display the full comprehensive, seismic survey image 38 by collecting seismic data based on the higher frequency data which has limited susceptibility to lost or degraded data due to the reduced source volume. In some applications, this collected seismic data may be referred to as a first data set. Low frequency data which is potentially lost due to the reduced seismic source volume is replaced with complementary seismic data which may be acquired from a receiver-side acquisition method, as described in greater detail below. In some applications, the complementary data may be referred to as a second data set. Depending on the configuration of source array 22, the seismic data and the complementary, low frequency data may be collected simultaneously or sequentially via a single set of streamers 26 or with separate sets of streamers. In some applications, separate sub-arrays may be employed simultaneously or otherwise to collect the seismic data and complementary data. Additionally, the first set of data set may be collected by towing streamers at a shallow depth, e.g. 7 m or less.

From an environmental perspective, it would be beneficial to use as small a source energy as possible. However, such an approach is simplistic and does not consider either the hearing sensitivity of marine mammals, nor does it consider the impact on the required seismic image. Reduction in source energy will impact the seismic image and it is not straightforward to calculate what minimum volume is required for any given seismic survey in order to image the reservoir correctly. It is widely accepted and understood that for deeper targets low frequency source output is important and this is usually addressed by increasing the size of the total source volume. This, of course, increases the output at all frequencies not just in the required low frequencies.

Figure 2:
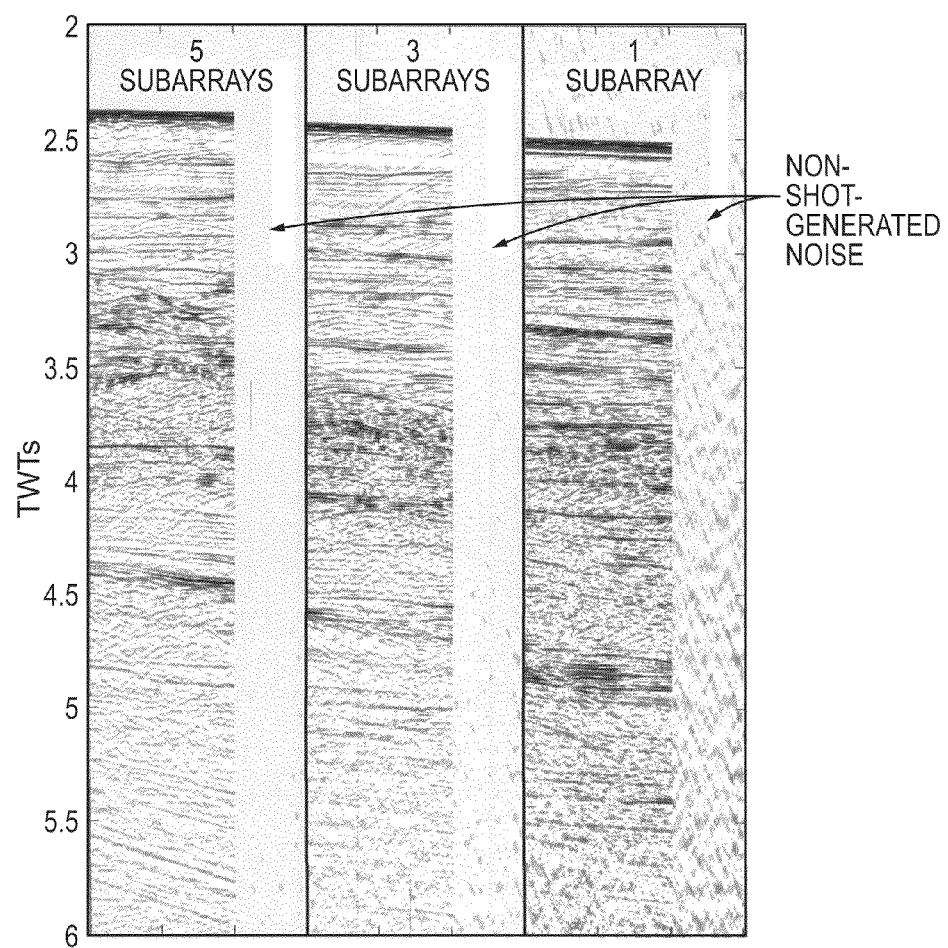
FIG. 2 is a graphical illustration of seismic data acquired using various sub-arrays compared to data showing the ambient background and self noise of the acquisition system.

Referring generally to FIG. 2, an example of stacked images of an experiment acquired in the Gulf of Mexico is illustrated. These data were acquired in a long 2D line where the source strength differed along the line. Data was also acquired with no guns firing in order to record the "ambient" i.e., background and self noise of the acquisition system. The left panel shows data that were acquired using 5 sub-arrays (a large source), the center panel, using 3 sub-arrays (a typical source), and the right panel shows data acquired using 1 subarray (a small source). On the right of each panel is data from the image with no guns fired at all (but processed in exactly the same way), showing the "ambient" noise of the system. All three panels are scaled so that the vertical downgoing far-field source signature would have approximately the same amplitude. Note that the panels are not the same subsurface structure as they were acquired in a continuous 2D line.

Visually, one can observe the reduction in signal-to-noise ratio as a function of reducing source strength and if we calculate the signal-to-noise ratio of these images it degrades from about 60 dB to 10 dB, on average, as the source strength reduces. However, if we calculate this as a function of frequency we find that the reduction in signal-to-noise ratio is dominated by the low frequencies (particularly deeper in the section). This suggests that we have more than sufficient high frequency output, even with only one sub-array. For these data the cross-over frequency is about 27.5 Hz, below which the higher source output would be needed if the methodology described herein were not employed.

Figure 3:
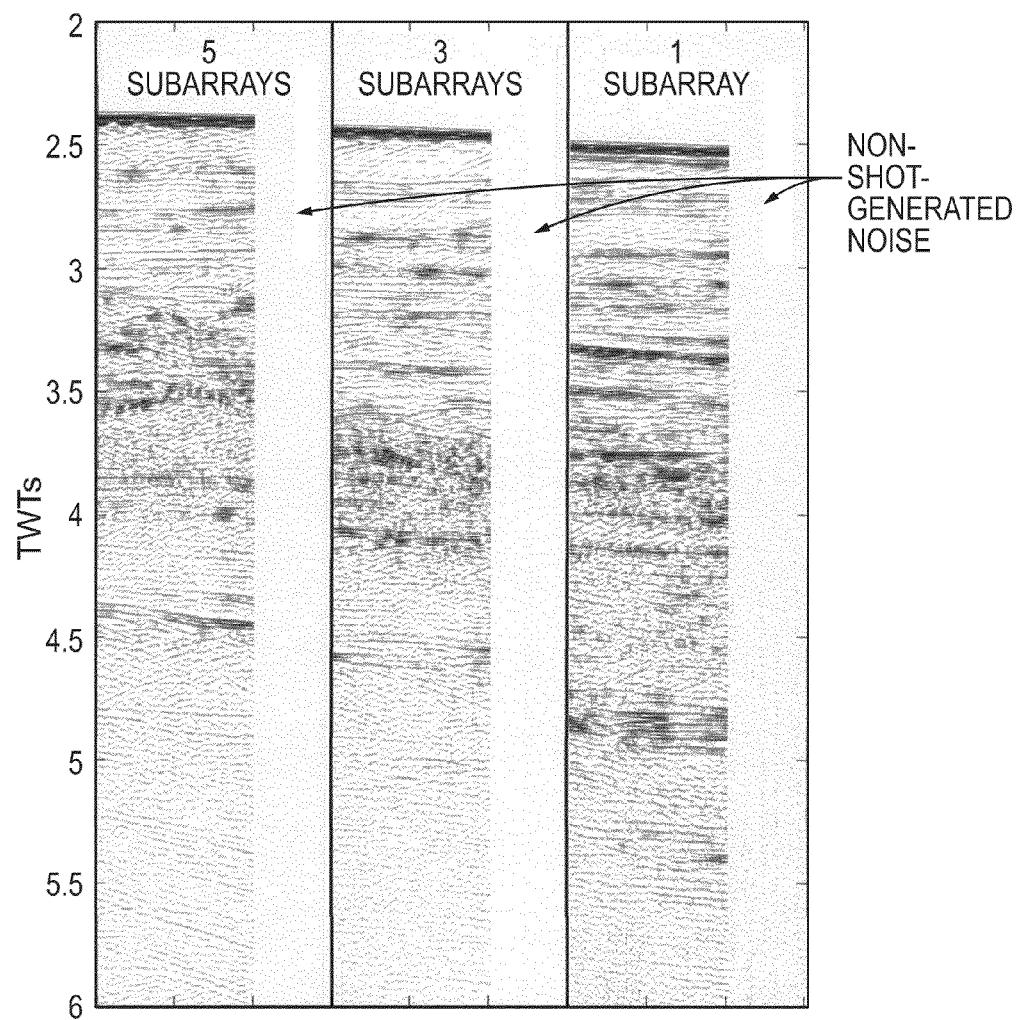
FIG. 3 is a graphical illustration similar to that illustrated in FIG. 2 in which the data has been filtered with a 27.5 Hz cutoff frequency.

Referring generally to FIG. 3, the same stacked images as FIG. 2 are illustrated, but with the data having been low cut filtered with a 27.5 Hz cut off frequency. After filtering, the images appear very similar in terms of signal-to-noise ratio. In this example we can acquire the seismic data, e.g. the first set of higher frequency data, with only a single sub-array and obtain a perfectly acceptable seismic image above 27.5 Hz. This has a significant beneficial impact on the marine mammal damage zone.

However, low frequencies are important for the deeper image quality and are particularly important for obtaining a stable seismic wavelet suitable for inversion and pre-stack processing. It is therefore necessary to replace, e.g. "put back", these low frequencies into the seismic image acquired using low volume, e.g. small, source arrays. This can be achieved by marrying the reduced source acquisition with secondary methods, e.g. seismic receiver-side acquisition methods. The receiver-side acquisition methods are designed to increase the signal-to-noise ratio, particularly in the lower frequencies (below around 20 Hz) where the lack of source energy is most significant.

Figure 4:
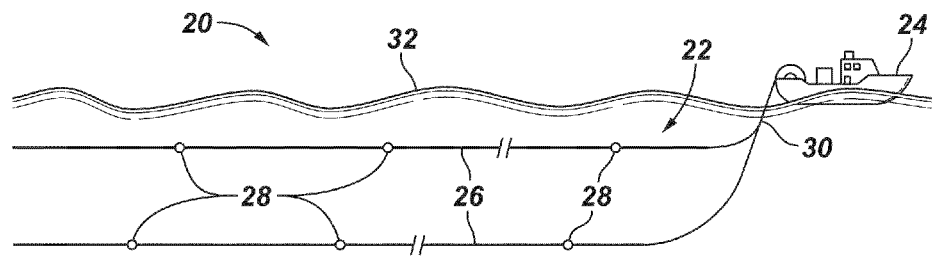
FIG. 4 is a schematic view of a seismic vessel pulling a seismic source array employed in a receiver-side acquisition method, according to an embodiment of the present invention.
Figure 5:
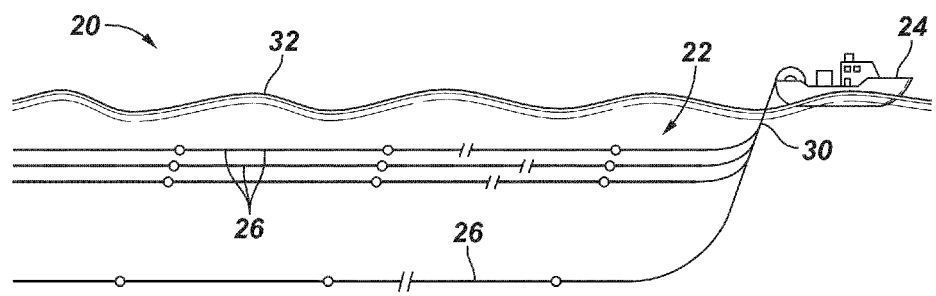
FIG. 5 is a schematic view of a seismic vessel pulling a seismic source array employed in another receiver-side acquisition method, according to an embodiment of the present invention
Figure 6:
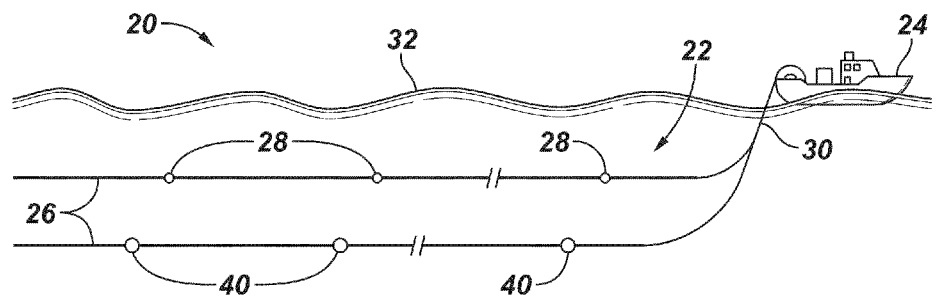
FIG. 6 is a schematic view of a seismic vessel pulling a seismic source array employed in another receiver-side acquisition method, according to an embodiment of the present invention.

Examples of receiver-side acquisition methods are illustrated in FIGS. 4-6. Referring initially to FIG. 4, an over/under streamer acquisition method is illustrated. This method of over/under streamers is described in Hill, D., Combee, L., and Bacon, J. [2006] *Over/under acquisition and data processing: the next quantum leap in seismic technology? First Break*, 24 (6), 81-96. As illustrated in FIG. 4, the over/under method employs streamers 26 which are towed in one or more pairs of streamers 26 with the streamers 26 of each pair located at different streamer depths. In this approach, each pair of streamers 26 is configured with one streamer vertically above the other. The depths of the paired streamers are typically deeper than the streamer depths used in conventional streamer configurations. As a result, the over/under streamer acquisition method works well in obtaining the low frequency data, i.e. the complementary data, to replace the data lost/ missed from the collected seismic data due to the reduced seismic source volume.

In FIG. 5, another example of a receiver-side acquisition method is illustrated and may be referred to as a sparse under marine acquisition method. This sparse under marine acquisition method is described in Kragh, E., Svendsen, M., Kapadia, D., Busanello, G., Goto, R., Morgan, G., Muyzert E., and Curtis, T. [2009] *A Method for Efficient Broadband Marine Acquisition and Processing*. 71*st EAGE Conference & Exhibition*, Extended Abstracts, V018. As illustrated in FIG. 5, the sparse under marine acquisition method utilizes a towed spread of shallow streamers. For example, the streamer array may have a plurality of shallow streamers 26 (nominally at the same depth), e.g. six shallow streamers, and a lower number of deeper streamers 26, e.g. two deeper streamers. Again, the sparse under marine acquisition method works well in obtaining the low frequency data, i.e. the complementary data, to replace the low frequency data not available in the collected seismic data due to the reduced seismic source volume.

Another example of a receiver-side acquisition method for acquiring low frequency data is illustrated in FIG. 6. The illustrated system and methodology may be referred to as a multi-component streamer acquisition method and is described in Long, A., Mellors, D., Allen, T., and McIntyre, A. [2008] *A calibrated dual-sensor streamer investigation of deep target signal resolution and penetration on the NW Shelf of Australia*. 78$^{th}$ *Annual International Meeting, SEG*, Expanded Abstracts, CH 2.7. As illustrated, the multi-component streamer acquisition method employs streamers 26 having multiple seismic receiver components 40 (for example pressure and velocity/acceleration sensors in the same streamer) which are able to obtain the desired low frequency data. As a result, the multi-component streamer acquisition method also works well in obtaining the low frequency data, i.e. the complementary data, to replace the seismic data lost/ missed due to the reduced seismic source volume.

Currently, the receiver-side acquisition methods are targeted at further enhancing low frequency content over what is available today. The principles according to the present disclosure use secondary approaches such as the receiver-side acquisition methods to obtain low frequency data so as to provide the comprehensive seismic survey image 38 without requiring conventional source volume. These secondary approaches are used to replace the low frequencies when they are lost while obtaining seismic data via reduced seismic source volumes which may be desired for environmental reasons.

Figure 7:
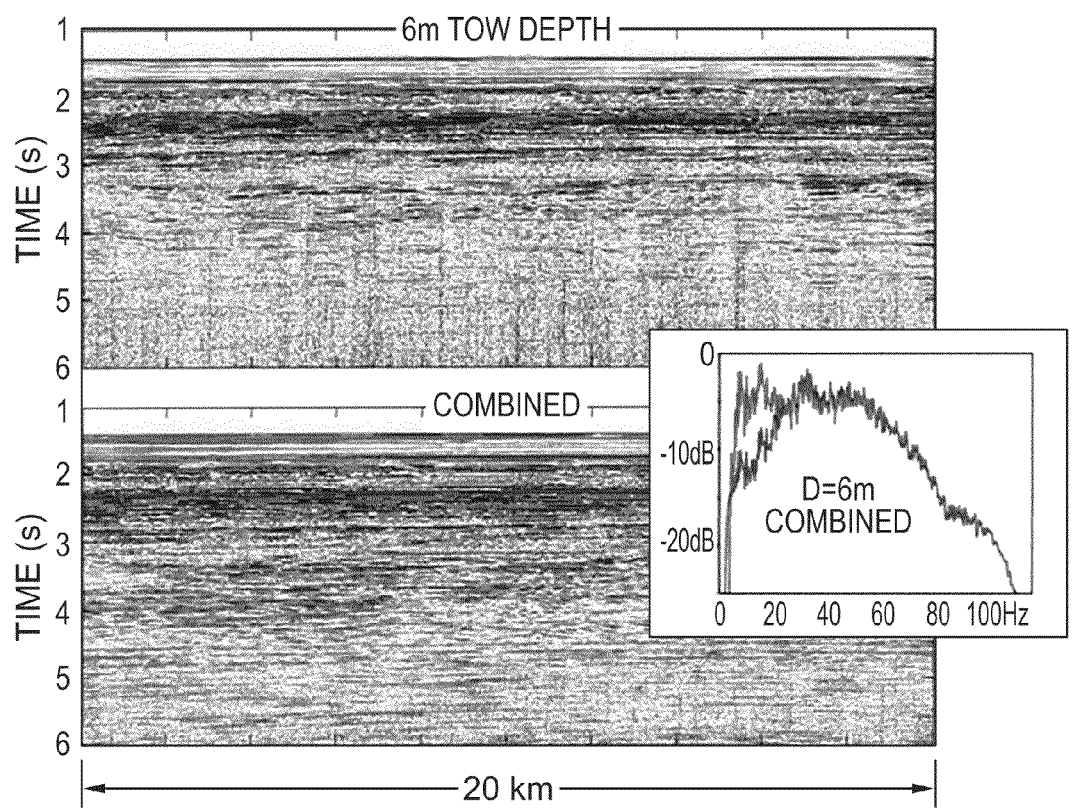
FIG. 7 is a graphical representation illustrating an improved, averaged amplitude spectra for low frequency data acquired through a receiver-side acquisition method, which data can be employed in the present overall methodology to enable reduced marine source volume while maintaining the seismic image quality, according to an embodiment of the present invention.

In a specific example, a receiver-side acquisition method for obtaining low frequency data is illustrated in the graphical representation found in FIG. 7. As seen from this example, the low frequency, complementary seismic data can be obtained for use with the overall data employed in constructing the comprehensive seismic survey image 38. The low frequency data in this example was acquired from a sparse under survey acquired off the North West Shelf of Australia in December 2008 (see Kragh et al., 2009). The top panel shows a 2D brute stack from the streamers at approximately 6 m depth. The bottom panel shows a 2D brute stack when deeper streamers, at approximately 20 m depth, are combined to form the image 38. The deeper streamers only contribute below 20 Hz in this example. Visually the increase in signal-to-noise ratio is significant, and the insert illustrates the averaged amplitude spectra showing a 10-12 dB increase in the low frequency output. Note that 12 dB is a factor of 4 and would thus compensate a four-fold factor in the source output at these low frequencies.

The embodiments discussed above provide examples of methodologies for collecting sufficient seismic data to provide comprehensive, seismic survey images with both higher and lower frequencies while substantially lowering the seismic source volume. Depending on the specific application, the size, configuration, and number of streamers, sub-arrays or arrays may be adjusted to obtain both the higher frequency data and the complementary, lower frequency data. The receiver-side acquisition methods described above provide examples of methodologies that may be employed to collect the lower frequency, complementary data, e.g. secondary data set. However, other techniques also may be used to collect/ compensate for the low frequencies. Regardless, the technique selected is able to provide the low frequency data, e.g. below 27.5 Hz and especially below around 20 Hz, which may not be fully obtained during the reduced source volume collection of the first set of seismic data. By combining techniques to collect both the high frequency seismic data and the complementary low frequency seismic data, the required seismic source volume to obtain the desired seismic survey image can be reduced by a factor of 4 or more compared to conventional survey techniques.

It should be further noted that a variety of supporting equipment and components may be employed in carrying out the methodology described herein. For example, a variety of single or plural tow vessels may be employed. The lengths of the streamers, as well as the depths at which the streamers are towed, may be adjusted according to the environment and the specifics of a given application. Furthermore, the types of seismic sources as well as the corresponding receivers may vary from one application to another. The computer system also may be adjusted to process various types of data and data sets to provide the comprehensive seismic survey image desired for a given application. Additionally, the datasets may be collected simultaneously or separately and combined according to various processing techniques to provide the information desired via, for example, the computer display.

Although only a few embodiments of the present invention have been described in detail above, those of ordinary skill in the art will readily appreciate that many modifications are possible without materially departing from the teachings of this invention. Accordingly, such modifications are intended to be included within the scope of this invention as defined in the claims.

What is claimed is:

1. A method of acquiring seismic data, comprising:
conducting a seismic survey with a reduced source output to acquire seismic data via a receiver system;
replacing lost, low frequency data of the seismic data with complementary seismic data acquired separately from a receiver-side acquisition method;
using the complementary seismic data to improve the signal-to-noise achieved by the receiver system in the low-frequency data; and
combining the seismic data and the complementary seismic data acquired from the receiver-side acquisition method to obtain a comprehensive seismic survey image.

2. The method as recited in claim 1, wherein replacing lost, low frequency data comprises replacing data based on signals below approximately 20 Hz.

3. The method as recited in claim 1, wherein conducting comprises reducing source energy output by at least a factor of 4 relative to the energy needed for a standard seismic survey producing the same comprehensive seismic survey image.

4. The method as recited in claim 1, wherein combining comprises producing a seismic image on a computer display.

5. The method as recited in claim 1, wherein conducting comprises conducting the seismic survey with a plurality of streamers at a shallow depth of approximately 7 meters or less.

6. The method as recited in claim 1, wherein replacing comprises utilizing an over/under streamer acquisition method.

7. The method as recited in claim 1, wherein replacing comprises utilizing a sparse under marine acquisition method.

8. The method as recited in claim 1, wherein replacing comprises utilizing a multi-component streamer acquisition method.

9. A method for acquiring seismic data, comprising:
conducting a first seismic survey with seismic sources operated at a low source output with an insufficient signal-to-noise ratio to evaluate low-frequency signals below approximately 20 Hz;
obtaining seismic data from the seismic survey based on higher frequency signals having a frequency of at least 20 Hz to enable collection of comprehensive seismic data at the reduced seismic source output;
selecting the low source output with a desired signal-to-noise ratio while achieving a comparable low-frequency output by conducting a second seismic survey according to a different method than the first seismic survey to acquire low-frequency data; and adding the low frequency data, based on low frequency signals below approximately 20 Hz, wherein the different method of the second seismic survey is a receiver-side acquisition method.

10. The method as recited in claim 9, further comprising combining the high frequency signals and the low frequency signals to create a comprehensive survey image on a computer operated display.

11. The method as recited in claim 10, wherein combining comprises providing the comprehensive survey image based on data obtained with a seismic source energy output reduced by a factor of 4 compared to generating the comprehensive survey image without adding the low frequency data.

12. The method as recited in claim 9, wherein conducting comprises conducting the seismic survey with a plurality of streamers at a shallow depth.

13. The method as recited in claim 9, wherein adding comprises utilizing an over/under streamer acquisition method.

14. The method as recited in claim 9, wherein adding comprises utilizing a sparse under marine acquisition method.

15. The method as recited in claim 9, wherein adding comprises utilizing a multi-component streamer acquisition method.

16. A method, comprising:
conducting a seismic survey; and
lowering a seismic source output from an otherwise standard source output by collecting high frequency seismic data via a receiver system from a first survey procedure unable to obtain sufficient low-frequency seismic data;
replacing lost low frequency seismic data with data obtained from a complementary survey procedure; and
using data from the complementary survey procedure to improve the signal-to-noise achieved by the receiver system in the low frequency data while achieving a comparable low frequency output to that of the otherwise standard output.

17. The method as recited in claim 16, wherein lowering comprises replacing lost, low frequency seismic data by employing a receiver-side acquisition method.

18. The method as recited in claim 16, further comprising utilizing a computer to combine the high frequency seismic data and the low frequency seismic data and to display a seismic image based on the combined data.

19. The method as recited in claim 16, wherein conducting comprises towing a plurality of streamers with seismic sources.

* * * * *